Patented Apr. 7, 1936

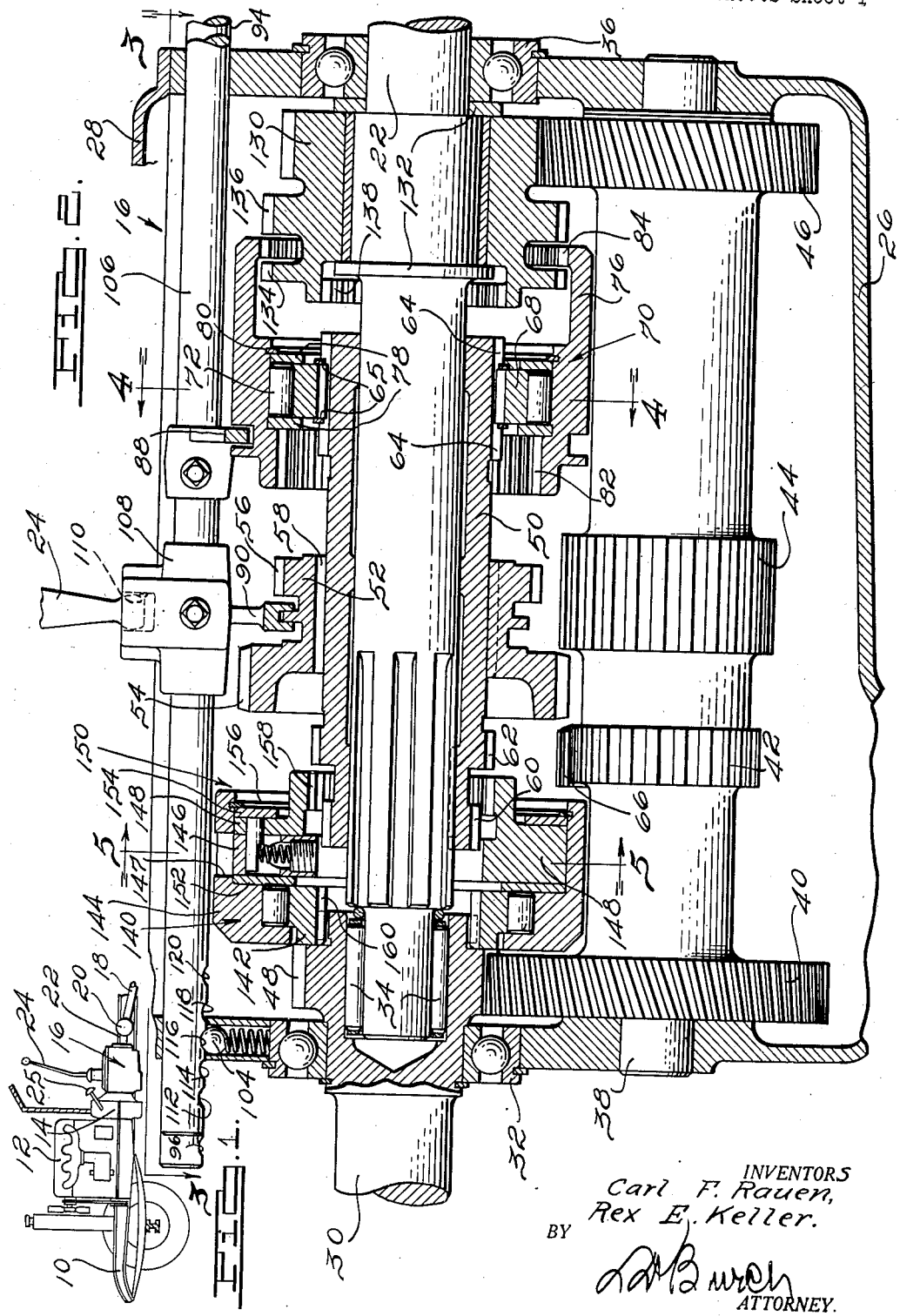

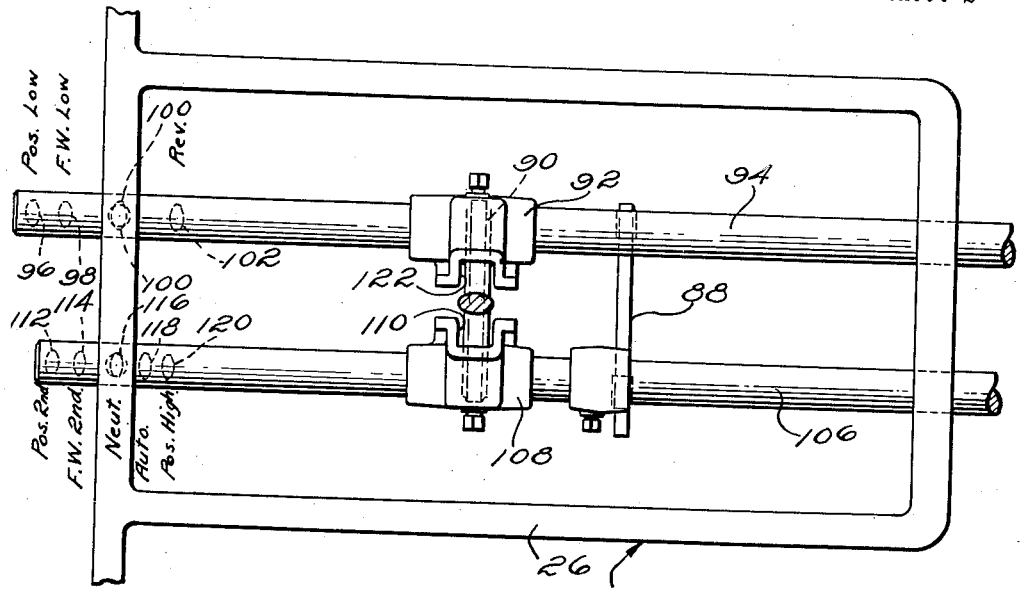
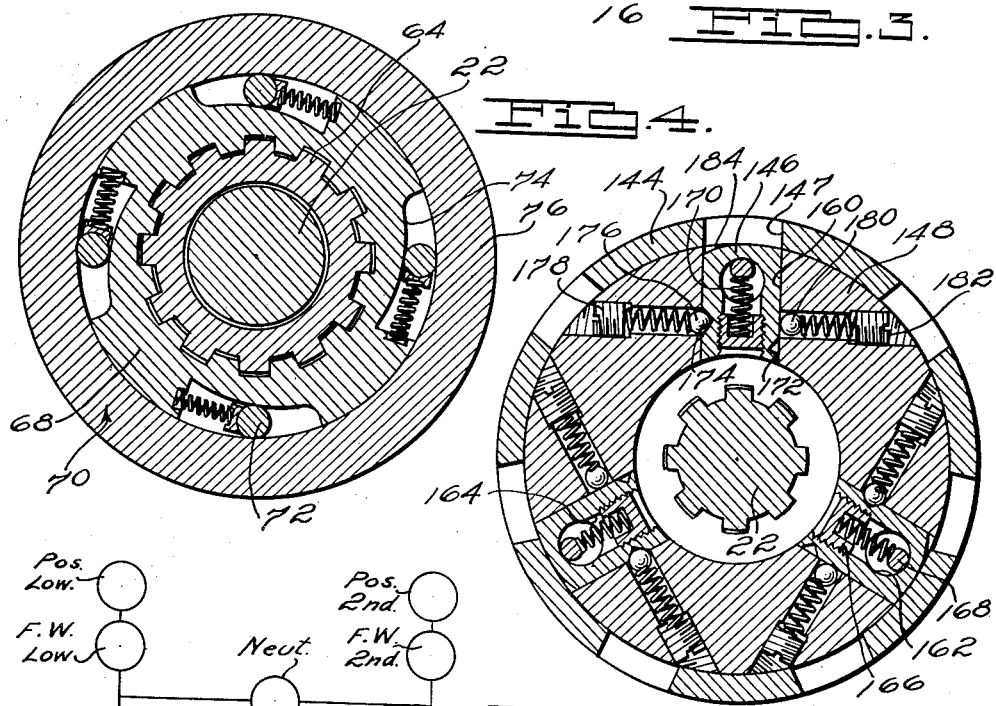

2,036,500

UNITED STATES PATENT OFFICE 2,036,500

AUTOMATIC TRANSMISSION

Carl F. Rauen, Grosse Pointe, Mich., and Rex E. Keller, Beverly Hills, Calif.; said Rauen assignor, by mesne assignments, to Borg-Warner Corporation, a corporation of Illinois Application November 4, 1933, Serial No. 696,626

15 Claims. (Cl. 74—336)

Our invention relates to automatic transmissions or speed changing mechanisms and, as illustrated, is particularly adapted for use in automotive vehicles. Our invention contemplates the provision in an automatic transmission or speed changing mechanism of means operable for providing either a one-way or free wheeling drive, or a two-way or positive drive in all forward speeds together with means normally operable responsive to predetermined conditions of operation for automatically effecting a change in the driving ratio.

An object of our invention is, therefore, to provide an automatic transmission in which normally a change in the driving ratio may be automatically effected under any one of a plurality of predetermined conditions of operation.

Another object of our invention is to provide a transmission in which free wheeling and positive drives are provided in all forward speeds.

Another object of our invention is to provide a transmission in which a change from any one driving ratio to any other next succeeding driving ratio may be effected at any time.

Another object of our invention is to provide in a transmission, in which normally a change in the driving ratio may be automatically effected under any one of a plurality of predetermined conditions of operation, means for manually effecting a change in the driving ratio without regard to the automatic speed changing mechanism.

Other objects and advantages will appear from the following specification with reference to the accompanying drawings of which there are two sheets, and in which:

Fig. 1 is a diagrammatic view illustrating an automotive vehicle in which our automatic transmission has been incorporated;

Fig. 2 is a longitudinal view partly in section, disclosing the internal construction of our automatic transmission;

Fig. 3 is a top plan view of the yoke rod mechanism for the transmission illustrated in Fig. 2;

Fig. 4 is a vertical cross-sectional view taken on the line 4—4 of Fig. 2 and looking in the direction of the arrows and illustrating the constructional details of an overrunning or free wheeling clutch;

Fig. 5 is a vertical cross-sectional view taken on the line 5—5 of Fig. 2, looking in the direction of the arrows and illustrating the constructional details of the automatic clutch or speed changing mechanism; and Fig. 6 is a diagrammatic view of the different positions for the handle of the gear shift lever.

Referring to Fig. 1 of the drawings, there is shown a diagrammatic view of a portion of an automotive vehicle comprising a main frame member 10 providing a suitable support for an engine 12, a housing-enclosed clutch 14, a transmission indicated generally at 16, a propeller shaft 18 connected through a universal joint 20 to the driven shaft 22 of the transmission, and a shift lever 24 providing a manual control for the transmission. An engine throttle control 25 is provided for regulating the speed of the engine 12. The transmission 16 in general comprises a casing 26 providing a housing for enclosing the operating mechanism of the transmission, a cover plate 28 providing a support for the shift lever 24, a driving shaft 30 connected to the engine through the housing-enclosed clutch 14, a driven shaft 22, and suitable gearing for providing a plurality of different driving connections between the driving shaft 30 and the driven shaft 22.

Having reference now to Fig. 2, the driving shaft 30 is journaled in a bearing 32 suitably secured in an aperture provided in the forward wall of the casing 26. The driven shaft 22 at its forward end is journaled in a bearing 34 secured in a counterbore of the driving shaft 30, and at its rearward end is journaled in a bearing 36 suitably secured in an aperture in the rearward wall of the casing 26. A countershaft 38 is secured in the forward and rearward walls of the casing 26 and against rotation and has rotatably mounted thereon a cluster of gears 40, 42, 44 and 46.

A portion of the driving shaft 30 adjacent one end thereof and within the casing 26 may be formed to provide a helical gear 48 which is adapted constantly to mesh with helical gear 40 on the countershaft for the purpose of rotating the cluster of gears whenever the engine is operating and the driving shaft 30 is connected thereto. An elongated sleeve 50 is slidably splined to the driven shaft 22 and carries freely mounted thereon a gear 52 provided with two sets of external radial teeth 54 and 56 and internal splines 58. Sleeve 50 is provided with a plurality of sets of external radial teeth 60, 62, and 64. Gear 52 is adapted to be moved to the left, looking at Fig. 2, to mesh teeth 54 with the teeth on an idler gear 66, which is rotatably mounted on a shaft suitably supported within the casing 26 and which is in constant mesh with gear 42 on the countershaft, and to mesh splines 58 with teeth 62 on the sleeve for the purpose of providing a reverse driving connection between the shafts 30 and 22 through the intermediary of helical gears 48 and 40, gears 42, 66, and 54, and sleeve 50 which is splined to the driven shaft 22.

An internally toothed annulus 68 locked to the sleeve 50 through the medium of teeth 64 and secured against lateral displacement by snap rings 65 comprises the driven member of an overrunning or free wheeling clutch indicated generally at 70. A series of spring pressed rollers 72 are adapted to wedge between cammed surfaces 74 uniformly disposed about the periphery of the annulus 68 and the inner surface of the driving member or shell 76 of the overrunning clutch mechanism for the purpose of driving the annulus 68 with the shell 76 when the shell 76 tends to rotate counter-clockwise with respect to the annulus 68, looking at Fig. 4, and to permit the annulus 68 to rotate counter-clockwise with respect to the shell 76. Washers 78 and snap ring 80 serve to confine the rollers 72 in position and to retain the shell 76 in place relative to the annulus 68. Shell 76 is provided at its opposite ends, with sets of internal radial teeth 82 and 84 and with an external annular groove 86 which is adapted to receive a shift fork 88.

Movement of the gear 52 to the right, looking at Fig. 2, until teeth 56 thereof mesh with internal radial teeth 82 on the shell 76 of the overrunning clutch will mesh teeth 54 with those of the gear 44 for providing a low speed, one-way or free wheeling drive between the driving and driven shaft and through the intermediary of helical gears 48 and 40, gears 44 and 52, overrunning clutch 70, and sleeve 50 which is splined to the driven shaft. Further movement of the gear 52 to the right to mesh splines 58 with teeth 64 is adapted to provide a two-way or positive low speed drive between the driving and driven shaft and through the intermediary just described with the exception that the overrunning clutch 70 is now locked out, due to the engagement of spline 58 with teeth 64 on the sleeve 50. A shift fork 90, depending from a collar 92 rigidly secured to a yoke rod 94 slidably secured in the forward and rearward walls of the casing 26, is provided for moving the gear 52 either to the left or the right, looking at Fig. 2.

Yoke rod 94 is provided with a series of notches 96, 98, 100 and 102 corresponding respectively with the positive low, free wheeling low, neutral and reverse positions of the yoke rod and which are adapted to be engaged by a spring pressed poppet or detent secured in the forward wall of the casing 26 for the purpose of locating the different positions of the yoke rod and for holding the same against undesirable movement. A second yoke rod 106 slidably secured in the forward and rearward walls of the transmission casing carries the shift fork 88 and has fixedly secured thereto a collar 108 providing a gate 110 for receiving the lower end of the gear shift lever. The yoke rod 106 is provided on its under side with a series of notches 112, 114, 116, 118 and 120 corresponding respectively with the positive second, free wheeling second, neutral, automatic and positive high positions of the yoke rod and which are adapted to be engaged by a spring pressed poppet 104 which is secured in the forward wall of the transmission casing 26. The bottom end of the gear shift lever 24 is adapted to enter gate 110 for the purpose of moving the yoke rod 106 and to enter gate 122 provided in the collar 92 for the purpose of moving the yoke rod 94, for the purpose of manually selecting any desired gear position.

An intermediate speed helical gear 130 is rotatably mounted upon the driven shaft 22 and secured against lateral displacement thereon by suitable thrust members 132 and is provided with two sets of external radial teeth 134 and 136 and a set of internal radial teeth 138.

A high speed overrunning clutch indicated generally at 140 and similar in construction and operation to the overrunning clutch indicated generally at 70 comprises an internally toothed driving member 142 secured to the end of the driving shaft 30 and a driven member 144. The overrunning clutch 140 comprises the driving member of an automatic clutch indicated generally at 150. The driving member of the automatic clutch comprises a drum-shaped member 144 provided with a plurality of slots 147 equidistantly spaced about the periphery thereof and adapted to receive at any one time, any one of a plurality of centrifugally operable, radially movable bolts 146 carried by the driven member or core 148 of the automatic clutch 150. Washers 152 and 154 and snap ring 156 are adapted to position and hold the core 148 within the drum-shaped member 144. The core 148 is provided with an internal set of teeth 158 which are adapted to mesh with teeth 62 on the sleeve 50 when the latter is moved to the left. The driving member 142 of the overrunning clutch 140 is provided with an internal set of teeth 160 which are adapted to mesh with teeth 60 on the sleeve 50 when the latter is moved to its leftmost position, looking at Fig. 2.

Each of the bolts 146 is slidably mounted in a radial groove or slot 160, a series of which are provided in the core or driven member 148. Each of the bolts 146 is provided with a transverse bore 162 adjacent one end thereof and a centrally disposed longitudinal bore 164 in which a plug 166 is threadedly secured. A pin 168 carried by the core 148 projects into the transverse bore 162 and confines between a flatted surface of the pin and the threaded plug 166, a spring 170 which tends to hold the bolt in its inner or retracted position. The position of the plug may be adjusted for varying the tension of the spring.

Each bolt is further provided with a notch on each face thereof and offset with respect to each other. As shown in Fig. 5, a spring pressed poppet 176 backed by an adjustable plug 178 and carried by the core 148 is in engagement with notch 174 of the bolt 146. Bolts 146 are movable outwardly under the influence of centrifugal force resulting from rotation of the core or driven member 148. The tension of the spring 170 is adapted to resist outward movement of the bolt 146 responsive to centrifugal force until the force is sufficient to overcome the tension of the spring. The spring pressed poppet 176 in engagement with the notch 174 on the bolt, has the effect of increasing the starting inertia of the bolt 146, and may be adjusted for varying the amount of centrifugal force required to move the bolt radially outwardly.

A spring pressed poppet 180 backed by an adjustable plug 182, is adapted to engage notch 172 when the bolt is in its outward or projected position for the purpose of holding the bolt against inward movement until the tension of the spring 170 is greater than the centrifugal force resulting from rotation of the core 148 and the force with which the poppet engages the notch 172.

The poppet 180 may be adjusted for varying the speed of rotation of the core 148 at which the bolt will return to its retracted position. Due to the shifting of the center of gravity, of the bolt 146 away from the axis of rotation, the bolt 146 normally will return to its retracted position at a lower speed of rotation of the core 148 than that at which it is movable outwardly. The poppet 180 has the effect of still further reducing the speed at which the bolt is movable inwardly which also serves to increase the differential between the speed at which the bolt is movable outwardly and inwardly.

The automatic clutch 150, as embodied in the transmission illustrated in Fig. 2, is adapted automatically to effect a change in the driving speed ratio from an intermediate free wheeling drive to a high speed free wheeling drive, or from a high speed free wheeling drive to an intermediate speed free wheeling drive. The automatic shift from intermediate to high is effected when the speed of rotation of the core or driven member 148 is sufficient to move one of the bolts 146 outwardly into one of the slots 147 in the member 144. It will be observed that the driving member 144 of the automatic clutch is provided with a greater number of slots 147 than is the driven member 148 provided with bolts 146. On this account only one of the bolts 146 can be in a projected position at any one time, because the other bolts are not at that same time, lined up with a slot in the driving member. It will be apparent that when the transmission is in intermediate speed ratio that the driving member 144 will be rotating at engine speed and the driven member 148 will be rotating at an intermediate speed, being connected to the driving shaft though the intermediary of teeth 62 on the sleeve 50, meshing with the teeth 158 on the core 148, overrunning clutch 70, teeth 84 thereon meshing with the teeth 134 on the intermediate speed helical gear 130 which is in constant mesh with the helical gear 46 of the countershaft, and gear 40 which is in constant mesh with the gear 48 of the driving shaft 30.

When the transmission is in an intermediate speed ratio, the driving member 144 of the automatic clutch will have a relative clockwise rotation with respect to the driven member 148 which is rotating at a slower rate of speed. If the speed at which the core 148 is rotating is sufficient to generate enough centrifugal force to overcome the tension of the spring 170 and of the poppet 176, the bolt 146 will tend to fly outwardly.

Each of the bolts 146 is provided with a tapered or beveled circumferential face 184 which causes the bolts 146 to jump the slots 147 whenever the speed of rotation of the member 144 is substantially greater than that of the member 148. When the speed of rotation of the member 144 is decelerated relative to that of the member 148 until the members are rotating at approximately the same rate of speed, one of the bolts 146 will be projected into one of the slots 147 for the purpose of connecting the members 144 and 148 together and thereby driving the driven shaft directly with the driving shaft through the intermediary of overrunning clutch 140, automatic clutch 150 and sleeve 50 which is in engagement with the member 148 of the automatic clutch through the engagement of teeth 62 and teeth 158 and which is splined to the driven shaft 22.

The overrunning clutch 70 permits the driven shaft 22 to overrun the intermediate speed gear 130 when the transmission is in automatic high driving ratio. In order to place the gear of the transmission in a position where the automatic shift from intermediate to high may be effected, the overrunning clutch 70 is shifted to the left, looking at Fig. 2, until the teeth 84 thereof are in mesh with the teeth 134 carried by the intermediate speed helical gear 130, when the teeth 62 on the sleeve 50 will be in mesh with the teeth 158 of the driven member 148 of the automatic clutch. After the speed of rotation of the driven member 148 is sufficient to move the bolts 146 radially outwardly, the speed of rotation of the driving member 144 may be reduced relative to that of the driven member by a temporary closing of the engine throttle, whereupon the automatic change will be effected.

Subsequently, an automatic change from a high speed gear ratio to an intermediate speed gear ratio, will be effected when the speed of rotation of the driven member 148 falls below that necessary to hold the bolt 146 in the outward position. Upon release of torque between the driving member 144 and the bolt 146, the spring 170 will move the bolt 146 inwardly for the purpose of disconnecting the driving and driven members of the automatic clutch whereby the intermediate speed gear 130 will again become operative for driving the driven shaft through the intermediary of the overrunning clutch 70 and the sleeve 50 which is splined to the driven shaft 22.

The transmission illustrated in Fig. 2 is adapted to provide a free wheeling drive in all forward speeds or a positive drive in all forward speeds, and is further adapted to permit a change from a free wheeling to a positive drive or from a positive drive to a free wheeling drive and/or from one driving ratio to another driving ratio at the same time. Movement of the overrunning clutch 70 to mesh the teeth 84 thereof, with the teeth 136, is adapted to provide an intermediate free wheeling drive between the driving shaft 30 and the driven shaft 22, and in effect locks out the automatic clutch 150. Further movement of the overrunning clutch 70 to the right until the teeth 64 carried by the sleeve 50 mesh with the teeth 138 carried by the gear 130 is adapted to provide a positive or two-way intermediate drive between the driving shaft and the driven shaft. The automatic clutch 150 will not be operable when the positive intermediate speed drive is connected.

As previously described, movement of the overrunning clutch 70 to the left until the teeth 84 thereof mesh with the teeth 134 of the intermediate speed gear 130, will mesh the teeth 62 on the sleeve 50 with the teeth 158 on the driven member 148 of the automatic clutch and will provide a free wheeling intermediate speed drive between the driving and the driven shaft and will be further adapted to actuate the automatic clutch 150 to provide a change in the driving ratio from an intermediate to a high speed drive when the speed of rotation of the driven shaft attains a predetermined rate. The high speed drive effected through the automatic clutch will be a free wheeling drive because of the interposition of the overrunning clutch 40 between the driving shaft and the automatic clutch 150. Further movement of the sleeve 50 to the left, will unmesh the teeth 84 and 134 and will mesh the teeth 60 carried on the forward end of the sleeve 50 with the internal teeth 160 on the driving member 142 of the overrunning clutch 140 to provide a positive high speed drive between the driving and driven shaft 30 and 22, respectively.

A change in the driving ratio from a positive high to a free wheeling high may be effected by merely moving the sleeve sufficient to disengage teeth 60 and 160 and by engaging teeth 84 on the overrunning clutch 70 with the teeth 134 on the intermediate speed gear 130, assuming that the speed of rotation of the driven shaft 22 is sufficient to maintain the bolts 146 in their outward or projected position. The sleeve 50 may be moved further to the right to mesh teeth 84 with teeth 136 to provide a free wheeling intermediate speed drive between the driving and driven shaft 30 and 22, respectively. Movement of the sleeve 50 to the right as far as possible will mesh the teeth 64 on the sleeve 50 with the teeth 138 on the intermediate speed gear 130 to provide a positive intermediate speed drive between the driving and driven shaft. In changing from a positive drive to a free wheeling drive, or from a free wheeling drive to a positive drive, in the same gear ratio, it will be necessary to release the torque between the intermeshing teeth before a change may be effected, and this may be accomplished by a momentary closing of the engine throttle.

A change from a positive high to a positive intermediate or from a positive intermediate to a positive high, may be effected without the necessity of disengaging the engine clutch because it is necessary to go through the free wheeling drive positions in order to make such change and for that reason a temporary reduction of the engine speed relative to that of the driven shaft would be sufficient to permit a change to be made manually. Similarly, a change from a positive low to a positive intermediate may be effected without the necessity of disengaging the engine clutch, because to go from one position to the other, it is necessary to go through free wheeling low and intermediate free wheeling speeds before either of the positive speeds can be reached, and for this reason a temporary reduction of the speed of the engine, such as by closing of the engine throttle, will be sufficient to permit a change in the driving ratio to be effected.

While several specific embodiments of our invention have been illustrated and described, it must be appreciated that many modifications may be made in the construction thereof without departing from the scope of the invention, and for that reason we do not desire to be limited to any particular form or arrangement except in so far as such limitations are included in the following claims:

1. In a transmission for connecting the driving wheels of an automotive vehicle to the engine thereof in a plurality of drives, the combination of a driving shaft having a clutch unit mounted thereon, said clutch unit including an overrunning clutch and a positive clutch element, a driven shaft having a gear rotatably mounted thereon and connected through a train of speed reduction gearing to the driving shaft, said gear being provided with a plurality of positive clutch elements, a clutch member slidably mounted on the driven shaft for rotation therewith and provided with means for engaging said clutch elements and said overrunning clutch for providing a plurality of driving connections between said shafts, said means including a positive clutch element engageable with a positive clutch element on said gear to provide a positive low speed drive, a second positive clutch element engageable with the positive clutch element of said clutch unit to provide a positive high speed drive, a free wheeling clutch engageable with a second one of said positive clutch elements on said gear to provide a free wheeling low speed drive, a third positive clutch element engageable with said overrunning clutch on said clutch unit when said free wheeling low speed drive is provided between said shafts, and means carried by said clutch unit and operable responsive to variations of the speed of rotation thereof above and below predetermined rates for determining the drive between said shafts when said free wheeling clutch and one of said clutch elements on said clutch member are in engagement with clutch elements on said gear and said clutch unit.

2. In a transmission device for providing a plurality of drives between the engine of an automotive vehicle and the road wheels thereof, the combination of a driving shaft having a clutch unit thereon, a driven shaft having an intermediate speed gear rotatably mounted thereon and connected through a train of speed reduction gearing to the driving shaft, a clutch member comprising a sleeve slidably splined to the driven shaft and an overrunning clutch carried by said sleeve, a low speed gear adapted to be driven through a train of speed reduction gearing from the driving shaft freely mounted on said sleeve and adapted to be connected thereto either directly or through said overrunning clutch to provide a low speed positive drive or a low speed free wheeling drive between said shafts, means on said intermediate speed gear for connecting the same to said sleeve either directly or through said overrunning clutch to provide an intermediate speed positive drive or an intermediate speed free wheeling drive between said shafts, clutch means on said sleeve engageable with said clutch unit for providing a high speed drive between said shafts, said clutch unit being provided with centrifugally operable means for effecting automatic changes between the free wheeling intermediate and the high speed drive responsive to variations of the speed of rotation of said driven shaft above and below predetermined rates at such time as said clutch means are in engagement with said clutch unit and said intermediate speed gear is connected to said sleeve through said overrunning clutch, and manipulative means for relatively moving said low speed gear and said sleeve for selecting a drive between said shafts.

3. In a transmission device, the combination of two gears rotatable at different rates of speed and adapted to be driven from a common source, a shaft adapted to be connected to said gears to be driven thereby in a plurality of drives, a clutch unit carried by said shaft and including a free wheeling clutch and positive clutch members, means for shifting one of said gears into operative engagement with one of said positive clutch members and said free wheeling clutch to provide either a positive or a free wheeling drive between said shafts and said common source, means for selectively shifting one of said positive clutch members and said free wheeling clutch of said clutch unit into operative engagement with the other of said gears to provide either a positive or a free wheeling drive between said shafts and said common source, and common manipulative means for optionally actuating said shifting means.

4. In a transmission, the combination of two gears adapted to rotate at different rates of speed, a driving shaft, speed reduction gearing for driving said gears and connected to said driving shaft, a driven shaft adapted to be connected to said gears in a plurality of drives, a clutch unit carried by said driven shaft and including a free wheeling clutch and positive clutch members, means for shifting the slower rotating of said gears into operative engagement with one of said positive clutch members and said free wheeling clutch to provide either a positive or a free wheeling drive between said shafts, means for selectively shifting one of said positive clutch members and said free wheeling clutch of said clutch unit into operative engagement with the faster rotating of said gears to provide either a positive or a free wheeling intermediate speed drive between said shafts, and means carried by said driving shaft and connectable to the driven shaft through one of the positive clutch elements of said clutch unit at such times as said free wheeling intermediate speed drive is provided to provide a high speed drive between said shafts, said last mentioned means including a clutch operable responsive to variations of the speed of rotation of the driven shaft above and below predetermined rates.

5. In a transmission, the combination of a driving shaft, a driven shaft having an intermediate speed gear rotatably mounted thereon, a cluster of gears connected to said driving shaft and to said gear, and clutch means for connecting the driving and driven shafts in a plurality of drives comprising a clutch member carried by the driving shaft, a clutch member carried by said gear, and a clutch element slidably splined to the driven shaft and cooperable with said clutch members to provide a drive between each of said members and said driven shaft, said clutch element having clutch members, one of which is an overrunning clutch, which are simultaneously engageable respectively with said other clutch members, said driving shaft clutch member being provided with centrifugally operable means for determining the drive between said driving and driven shafts when said clutch element is connected to both of said clutch members, and a low speed gear freely mounted on said clutch element and engageable with certain of the clutch members thereon and with said cluster of gears for providing either a positive or an overrunning low speed drive between said driving and driven shafts.

6. In a transmission, the combination of a driving shaft, a driven shaft having a gear rotatably mounted thereon, a countershaft provided with a cluster of gears and connecting said gear to the driving shaft, an elongated sleeve slidably connected to the driven shaft and provided with positive clutch members and a one-way clutch, a clutch element carried by the driving shaft and provided with a positive clutch member and a one-way clutch, clutch members provided on said gear, means for shifting said sleeve for selectively coupling a clutch member and said one-way clutch on said sleeve with certain of said clutch members on said gear for providing positive and free wheeling drives in intermediate speed, said means being operable for shifting said sleeve for selectively engaging certain of the clutch members thereon with said positive clutch members or said one-way clutch provided on said driving shaft clutch element for providing positive and free wheeling drives in high speed, a low speed gear freely mounted on said sleeve adapted to be connected to said cluster of gears and provided with clutch members, means for shifting said low speed gear for selectively engaging the clutch members thereon with a clutch member and said one-way clutch on said sleeve for providing positive and free wheeling drives between said driving and driven shafts in low speed, and common means for actuating said shifting means.

7. In a transmission, the combination of a driving shaft, a driven shaft having a gear rotatably mounted thereon, a countershaft provided with a cluster of gears and connecting said gear to the driving shaft, an elongated sleeve slidably connected to the driven shaft and provided with positive clutch members and a one-way clutch, a clutch element carried by the driving shaft and provided with a positive clutch member and a one-way clutch, clutch members provided on said gear, means for shifting said sleeve for selectively coupling a clutch member and said one-way clutch on said sleeve with certain of said clutch members on said gear for providing positive and free wheeling drives in intermediate speed, said means being operable for shifting said sleeve for selectively engaging certain of the clutch members thereon with said positive clutch members or said one-way clutch provided on said driving shaft clutch element for providing positive and free wheeling drives in high speed, a low speed gear freely mounted on said sleeve adapted to be connected to said cluster of gears and provided with clutch members, means for shifting said low speed gear in one direction for coupling the clutch members thereon with a clutch member and said one-way clutch on said sleeve for providing positive and free wheeling drives between said driving and driven shafts in low speed, said shifting means being operable for shifting said gear in the other direction for meshing a clutch member thereon with another of said clutch members on said sleeve to provide a reverse drive between said driving and driven shafts, and common means for actuating said shifting means.

8. A transmission mechanism providing a plurality of drives between the engine and the road wheels of an automotive vehicle comprising the combination of a driving shaft having a high speed clutch member thereon, a driven shaft having an intermediate speed gear rotatably mounted thereon and connected through a train of speed reduction gearing to the driving shaft, a clutch member comprising a sleeve slidably splined to the driven shaft and an overrunning clutch carried by said sleeve, a low speed gear adapted to be driven through a train of speed reduction gearing from the driving shaft freely mounted on said sleeve and adapted to be connected thereto either directly or through said overrunning clutch to provide a low speed positive drive or a low speed free wheeling drive between said shafts, means on said intermediate speed gear for connecting the same to said sleeve either directly or through said overrunning clutch to provide an intermediate speed positive drive or an intermediate speed free wheeling drive between said shafts, means on said sleeve engageable with said high speed clutch member for providing a positive high speed drive between said shafts, and manipulative means for moving said low speed gear and said sleeve for selecting a drive between said shafts.

9. A variable speed power transmitting mechanism having in combination two gears adapted to rotate at different rates of speed, a driving shaft, speed reduction gearing for driving said gears and connected to said driving shaft, a driven shaft adapted to be connected to said gears in a plurality of drives, a clutch unit carried by said driven shaft and including positive clutch members, means for shifting the slower rotating of said gears into operative engagement with one of said members to provide a low speed drive between said shafts, means for shifting another of said members of said clutch unit into engagement with the faster rotating of said gears to provide an intermediate speed drive between said shafts, and means carried by the driving shaft and connectable to the driven shaft through one of the clutch members of said clutch unit to provide a high speed drive between said shafts.

10. A transmission mechanism having in combination a driving shaft, a driven shaft having an intermediate speed gear rotatably mounted thereon, gearing connected to said driving shaft and to said gear, clutch means for connecting the driving and driven shafts in a plurality of drives comprising a clutch member carried by the driving shaft, a clutch member carried by said gear, and a clutch element slidably splined to the driven shaft and cooperable with said clutch members to provide a drive between each of said members and said driven shaft, and a low speed gear freely mounted on said clutch element and engageable therewith and with said gearing for providing a low speed drive between said driving and driven shafts, said clutch element comprising a part of a one-way clutch, another part of which is provided with means whereby it may be selectively engaged with the clutch member on said first mentioned gear and with said low speed gear.

11. A variable speed power transmitting mechanism having in combination a driving shaft having mounted thereon an overrunning clutch provided with clutch members for providing positive and free wheeling drives, a driven shaft having rotatably mounted thereon a gear connected to said driving shaft through a train of gears, and slidably mounted thereon an overrunning clutch provided with clutch members for providing positive and free wheeling drives, and shifting means for moving said driven shaft overrunning clutch to selectively couple the clutch members thereon with either said gear or the clutch members on said driving shaft overrunning clutch respectively for providing selective relative low and high speed free wheeling and positive drives between said shafts, and an automatic clutch mechanism operatively disposed between one of the clutch members of the driving shaft overrunning clutch and said driving shaft.

12. A variable speed power transmitting mechanism having in combination a driving shaft having mounted thereon an overrunning clutch provided with members for providing two-way and one-way drives, a driven shaft having rotatably mounted thereon an intermediate speed gear connected to said driving shaft through a train of gears, and slidably mounted thereon an overrunning clutch provided with clutch members for providing two-way and one-way drives, a low speed gear slidably mounted on one of the clutch members of said driven shaft overrunning clutch and adapted to be connected selectively to said clutch members of said overrunning clutch respectively and simultaneously therewith to one of the gears of said train of gears for providing one-way or two-way low speed drives between said shafts, and shifting means for moving said clutch members of the driven shaft overrunning clutch selectively to cooperate with said intermediate speed gear or the members of said driving shaft overrunning clutch respectively for providing selective intermediate and high speed free wheeling and positive drives between said shafts, and for moving said low speed gear into cooperative relationship with said driven shaft overrunning clutch members and said train of gears.

13. In a transmission device for providing a plurality of drives between the engine of an automotive vehicle and the road wheels thereof, the combination of a driving shaft having a clutch unit thereon, a driven shaft having a gear rotatably mounted thereon and driven from said driving shaft, a clutch mechanism including a sleeve slidably splined to the driven shaft, an overrunning clutch mounted on said sleeve, means on said gear for connecting the same to said sleeve through said overrunning clutch to provide a one-way drive between said shafts, clutch means on said sleeve engageable with said clutch unit, said clutch unit being provided with centrifugally operable means for providing a positive drive between said shafts at such time as said clutch means are in engagement with said clutch unit, and means for shifting said sleeve.

14. In a transmission, the combination of two driving elements adapted to be driven at different rates from a common source, a shaft adapted to be connected to said driving elements to be driven thereby, a clutch unit slidably mounted on said shaft and including positive clutch elements and an overrunning clutch, means for selectively shifting one of said driving elements into operative engagement with said overrunning clutch and said positive clutch elements, means for selectively shifting said positive clutch elements and said overrunning clutch into operative engagement with the other of said driving elements, and common means operable for optionally actuating said shifting means.

15. In a device of the class described, the combination of a driving shaft having a clutch unit mounted thereon, said clutch unit including a clutch element of a disconnectable clutch, a driven shaft having a gear rotatably mounted thereon and connected to be driven by said driving shaft through a train of gears, said gear being provided with a plurality of positive clutch elements, a clutch member slidably mounted on the driven shaft for rotation therewith and provided with means for engaging said clutch elements for providing a plurality of driving connections between said shafts, said means including a positive clutch element engageable with a positive clutch element on said gear to provide a positive low speed drive, a free wheeling clutch engageable with one of said positive clutch elements on said gear to provide a free wheeling low speed drive, a positive clutch element engageable with the clutch element of said clutch unit at such time as said free wheeling low speed drive is provided, and means carried by said clutch unit and operable responsive to variations of the speed of rotation thereof above and below predetermined rates for determining the drive between said shafts when the free wheeling clutch and one of said positive clutch elements are in engagement with the clutch element on said gear and said clutch unit.

CARL F. RAUEN.
REX E. KELLER.